US012545042B2

(12) United States Patent
Nagashima et al.

(10) Patent No.: US 12,545,042 B2
(45) Date of Patent: Feb. 10, 2026

(54) PRINTING APPARATUS

(71) Applicant: SEIKO EPSON CORPORATION, Tokyo (JP)

(72) Inventors: Yutaka Nagashima, Matsumoto (JP); Yusuke Kato, Shiojiri (JP); Nobuaki Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 18/520,659

(22) Filed: Nov. 28, 2023

(65) Prior Publication Data

US 2024/0181792 A1 Jun. 6, 2024

(30) Foreign Application Priority Data

Dec. 1, 2022 (JP) ................................. 2022-192616

(51) Int. Cl.
*B41J 29/13* (2006.01)

(52) U.S. Cl.
CPC .................................... *B41J 29/13* (2013.01)

(58) Field of Classification Search
CPC ........................................................ B41J 29/13
See application file for complete search history.

(56) References Cited

U.S. PATENT DOCUMENTS

2014/0232795 A1* 8/2014 Yanagishita ............. B41J 29/13 347/86
2020/0369055 A1* 11/2020 Nagai .................. B41J 2/17509

FOREIGN PATENT DOCUMENTS

JP 2013-216075 A 10/2013

* cited by examiner

*Primary Examiner* — Shelby L Fidler
*Assistant Examiner* — Tracey M Mcmillion
(74) *Attorney, Agent, or Firm* — WORKMAN NYDEGGER

(57) ABSTRACT

A printing apparatus includes: a head configured to perform printing on a medium; an outer packaging configured to accommodate the head; and an operating panel provided at a side surface of the outer packaging and configured to receive an operation, in which the operating panel includes a display surface, and in a state in which the display surface is tilted upward relative to the side surface, at least a portion of the operating panel is recessed into an inside of the outer packaging from the side surface.

5 Claims, 10 Drawing Sheets

PRINTING APPARATUS

The present application is based on, and claims priority from JP Application Serial Number 2022-192616, filed on Dec. 1, 2022, the disclosure of which is hereby incorporated by reference herein in its entirety.

BACKGROUND

1. Technical Field

The present disclosure relates to a printing apparatus.

2. Related Art

JP-A-2013-216075 discloses a technique of tilting upward an operating panel of a printer. The printer is given as one example of a printing apparatus.

By tilting the operating panel upward, the visibility of the operating panel improves. However, when the operating panel is tilted upward, the operating panel sticks out from the front surface of the printing apparatus. If the operating panel sticks out from the front surface of the printing apparatus, this may make it difficult to operate other portions of the printing apparatus.

SUMMARY

A printing apparatus includes a head configured to perform printing on a medium, an outer packaging configured to accommodate the head, and an operating panel provided at a side surface of the outer packaging and configured to receive an operation, in which the operating panel includes a display surface, and in a state in which the display surface is tilted upward relative to the side surface, at least a portion of the operating panel is recessed into an inside of the outer packaging from the side surface.

DESCRIPTION OF EMBODIMENT

Figure 1:
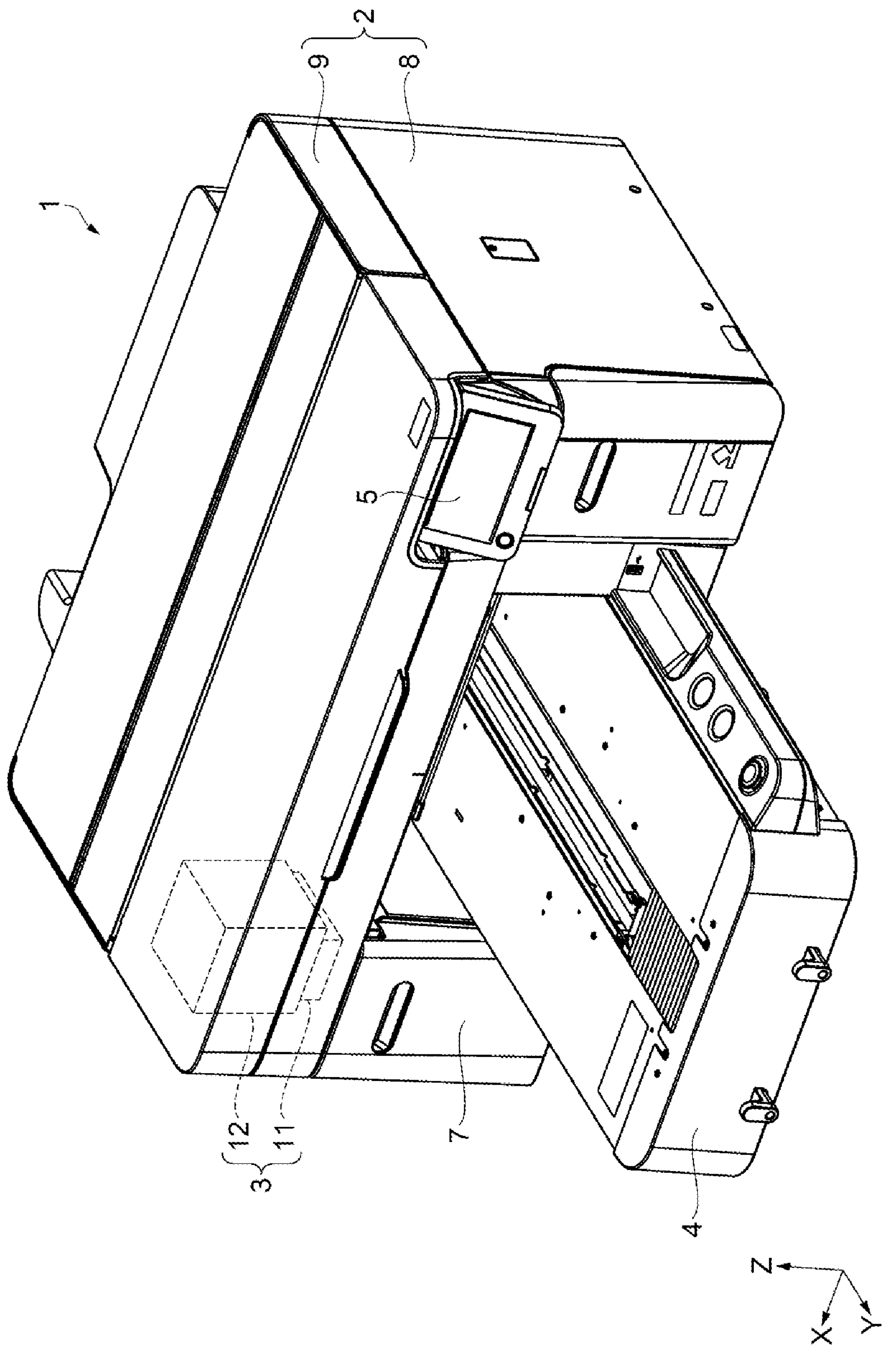
FIG. 1 is a perspective view illustrating a printing apparatus.

The printing apparatus 1 includes an outer packaging 2, a printing unit 3, a medium transport unit 4, and an operating panel 5, as illustrated in FIG. 1. The outer packaging 2 constitutes the outer shell of the printing apparatus 1. The printing unit 3 is accommodated in the outer packaging 2. The medium transport unit 4 protrudes from the inside of the outer packaging 2 to the outside of the outer packaging 2. Of side surfaces of the outer packaging 2, a side surface from which the medium transport unit 4 protrudes is a front surface 7 of the printing apparatus 1. The operating panel 5 is disposed at the front surface 7. The operating panel 5 receives an instruction through various types of operations concerning the printing apparatus 1. The outer packaging 2 includes a first outer packaging 8 and a second outer packaging 9. The front surface 7 at which the operating panel 5 is disposed serves as one example of a side surface of the outer packaging 2.

In FIG. 1, the X-axis, the Y-axis, and the Z-axis are illustrated. The X-axis, the Y-axis, and the Z-axis are coordinate axes perpendicular to each other. In FIG. 1 and the following drawings, the X-axis, the Y-axis, and the Z-axis are also illustrated on an as-necessary basis. In this case, the X-axis, the Y-axis, and the Z-axis correspond to the X-axis, the Y-axis, and the Z-axis in FIG. 1, respectively. FIG. 1 illustrates a state in which the printing apparatus 1 is disposed at an X-Y plane defined by the X-axis and the Y-axis. In the present embodiment, a usage state of the printing apparatus 1 is a state in which the printing apparatus 1 is disposed at the X-Y plane in a state in which the X-Y plane matches a horizontal flat surface. The posture of the printing apparatus 1 when the printing apparatus 1 is disposed at the X-Y plane that matches the horizontal surface is referred to as a usage posture of the printing apparatus 1.

In the following description, when the X-axis, the Y-axis, and the Z-axis are illustrated in the drawing or mentioned in relation to a constituent part or unit of the printing apparatus 1, the X-axis, the Y-axis, and the Z-axis indicate axes in a state in which the constituent part or unit is installed in the printing apparatus 1. In addition, the posture of the constituent part or unit of the printing apparatus 1 at the usage posture is referred to a usage posture of the constituent part or unit. In addition, in the following description concerning the printing apparatus 1 or its constituent element or unit or the like, such a description is made on the assumption that the printing apparatus 1 or its constituent element or unit or the like is disposed at the usage posture.

Note that, in a situation where the printing apparatus 1 is actually used, it is only necessary that the horizontal surface is a surface that is substantially horizontal. This substantial horizon includes, for example, a slope that falls within a range of slope permitted for the surface where the printing apparatus 1 is disposed when in use. Thus, the substantially horizontal surface is not limited, for example, to a highly precisely formed surface such as a machine plate. The substantially horizontal surface includes, for example, various types of surfaces of a desk, a stage, a shelf, a floor, or the like at which the printing apparatus 1 is disposed when in use. In addition, the vertical direction is not limited a direction exactly along the gravitational direction, and includes a direction perpendicular to the substantially horizontal surface. Thus, when the substantially horizontal surface is, for example, a surface of a desk, a stage, a shelf, a floor, or the like, the vertical direction represents the direction perpendicular to these surfaces.

An arrow is attached to each of the X-axis, the Y-axis, and the Z-axis. In each of the X-axis, the Y-axis, and the Z-axis, the arrowed direction indicates a direction of +(positive), and a direction opposite from the arrowed direction indicates a direction of − (negative). The Z-axis is an axis perpendicular to the X-Y plane. In the usage state of the printing apparatus 1, the +Z direction is a vertically upward direction.

In the usage state of the printing apparatus 1, the −Z direction is a vertically downward direction in FIG. 1.

Note that the printing unit 3 reciprocates along the X-axis. Thus, the X-axis is defined as a direction in which the printing unit 3 reciprocates. The printing unit 3 includes a printing head 11 and a carriage 12. The printing head 11 discharges ink toward a printing medium. The printing head 11 is mounted at the carriage 12. The carriage 12 reciprocates along the X-axis. As the carriage 12 reciprocates along the X-axis, the printing head 11 reciprocates along the X-axis.

The medium transport unit 4 protrudes in the +Y direction from the outer packaging 2. The +Y direction is a direction in which the medium transport unit 4 protrudes from the outer packaging 2. The medium transport unit 4 is disposed at the −Z direction of the printing unit 3. The second outer packaging 9 is disposed at the +Z direction of the first outer packaging 8. The medium transport unit 4 protrudes from the inside of the first outer packaging 8 toward the outside of the first outer packaging 8.

Figure 2:
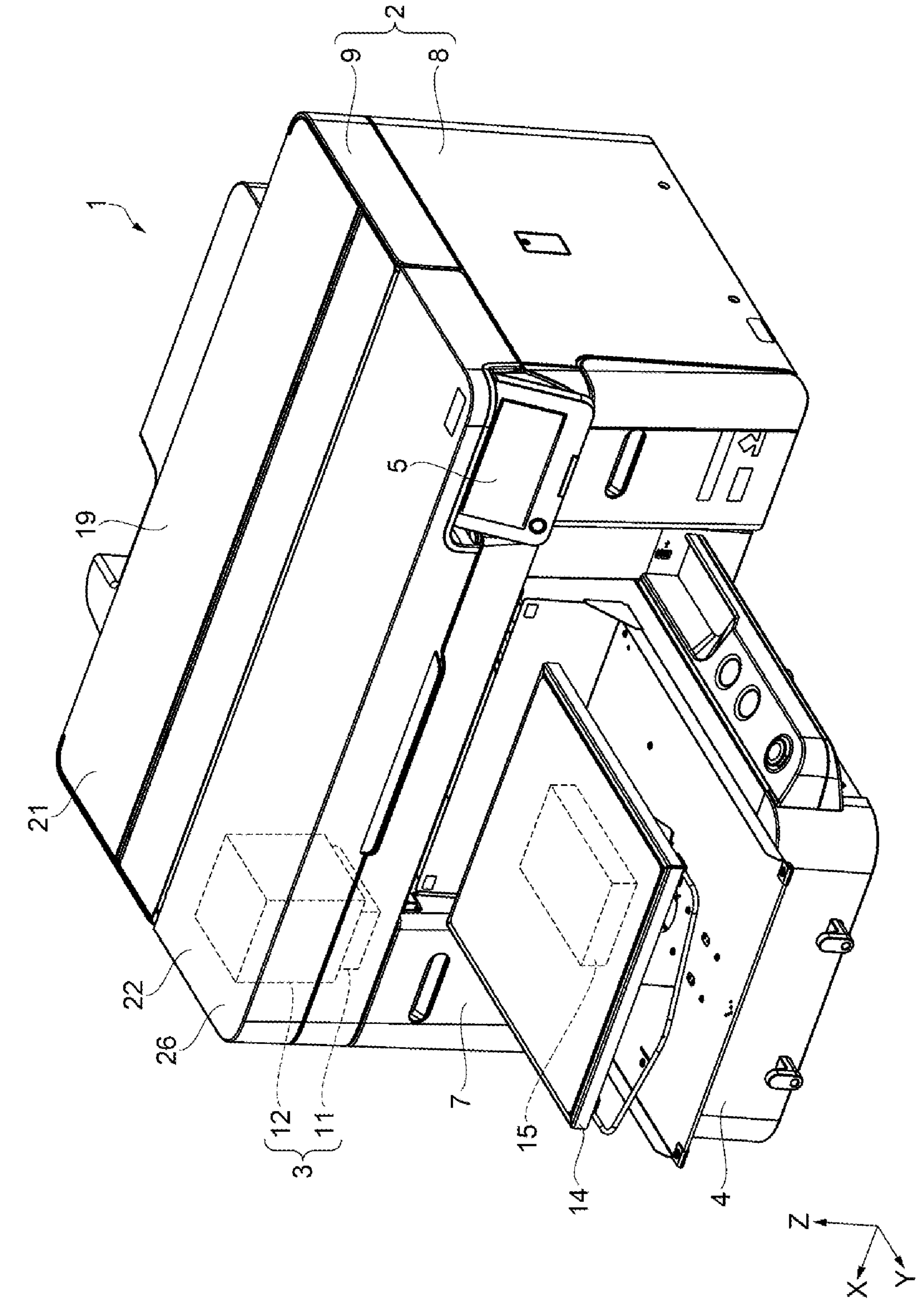
FIG. 2 is a perspective view illustrating the printing apparatus.

The medium transport unit 4 includes a tray 14 and a stage 15, as illustrated in FIG. 2. The tray 14 supports the printing medium. The tray 14 serves as one example of a medium support portion. The stage 15 supports the tray 14. The tray 14 is disposed at the +Z direction of the stage 15. With the medium transport unit 4, the stage 15 reciprocates along the Y-axis. With this configuration, the tray 14 reciprocates along the Y-axis. With the medium transport unit 4, the tray 14 reciprocates between the outside of the outer packaging 2 and the inside of the outer packaging 2. FIG. 2 illustrates a state in which the tray 14 is disposed at the outside of the outer packaging 2. FIG. 1 illustrates a state in which the tray 14 is disposed at the inside of the outer packaging 2.

As illustrated in FIG. 2, when the tray 14 is disposed outside of the outer packaging 2, the printing medium is set at the tray 14. The printing medium set at the tray 14 is transported to the inside of the outer packaging 2 by the medium transport unit 4. The printing apparatus 1 performs an operation of causing ink to be discharged from the printing head 11, and also perform an operation of moving the tray 14 in the +Y direction by a predetermined amount, thereby performing printing on the printing medium. At this time, the printing apparatus 1 causes ink to be discharged from the printing head 11 while causing the carriage 12 to reciprocate along the X-axis.

The second outer packaging 9 constitutes an upper surface 19 of the outer packaging 2. The upper surface 19 faces the +Z direction. The second outer packaging 9 includes a cover body portion 21 and an open-close cover 22. The open-close cover 22 constitutes a portion of the upper surface 19. The open-close cover 22 is configured so as to be able to rotate relative to the cover body portion 21.

Figure 3:
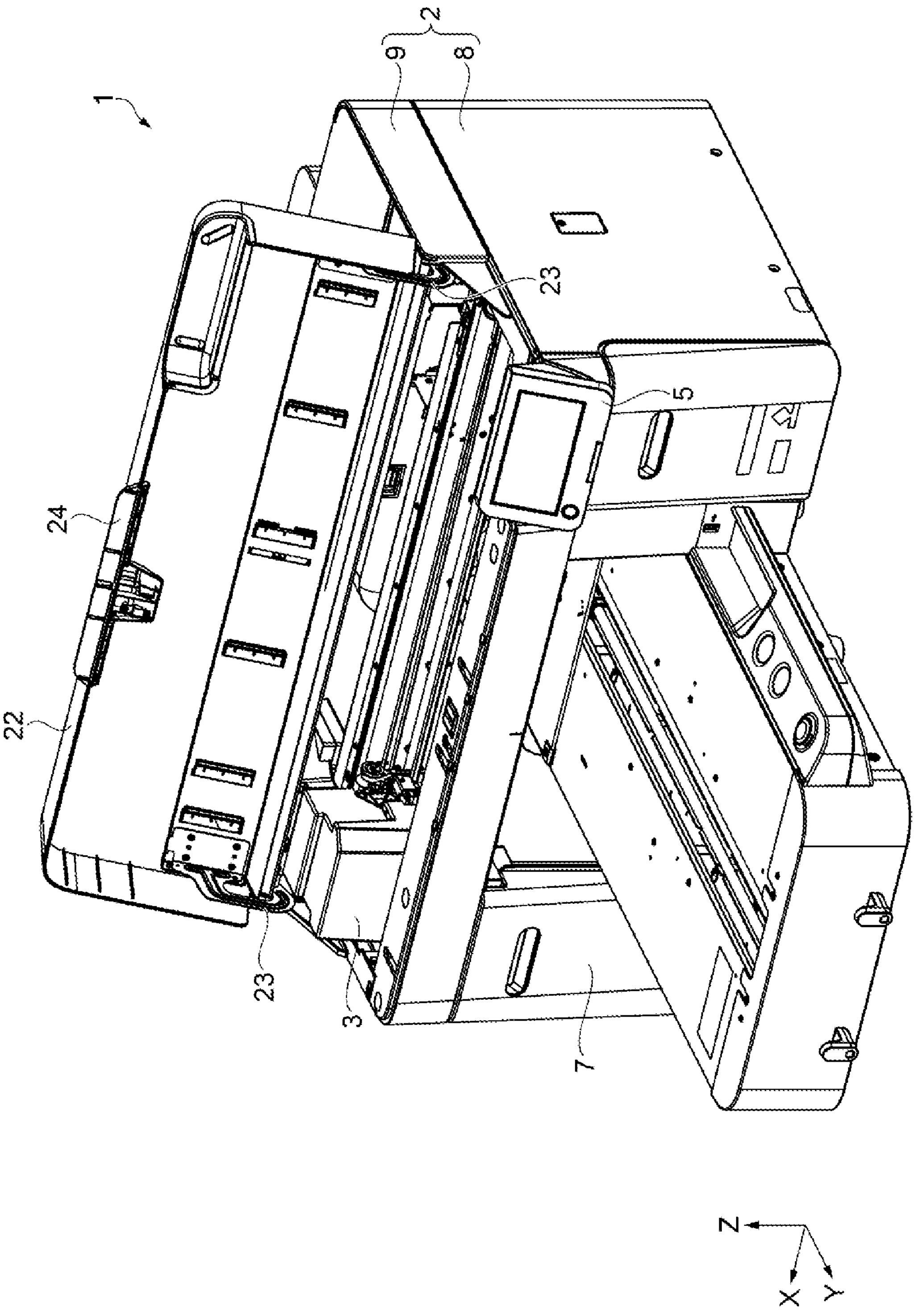
FIG. 3 is a perspective view illustrating the printing apparatus.
Figure 4:
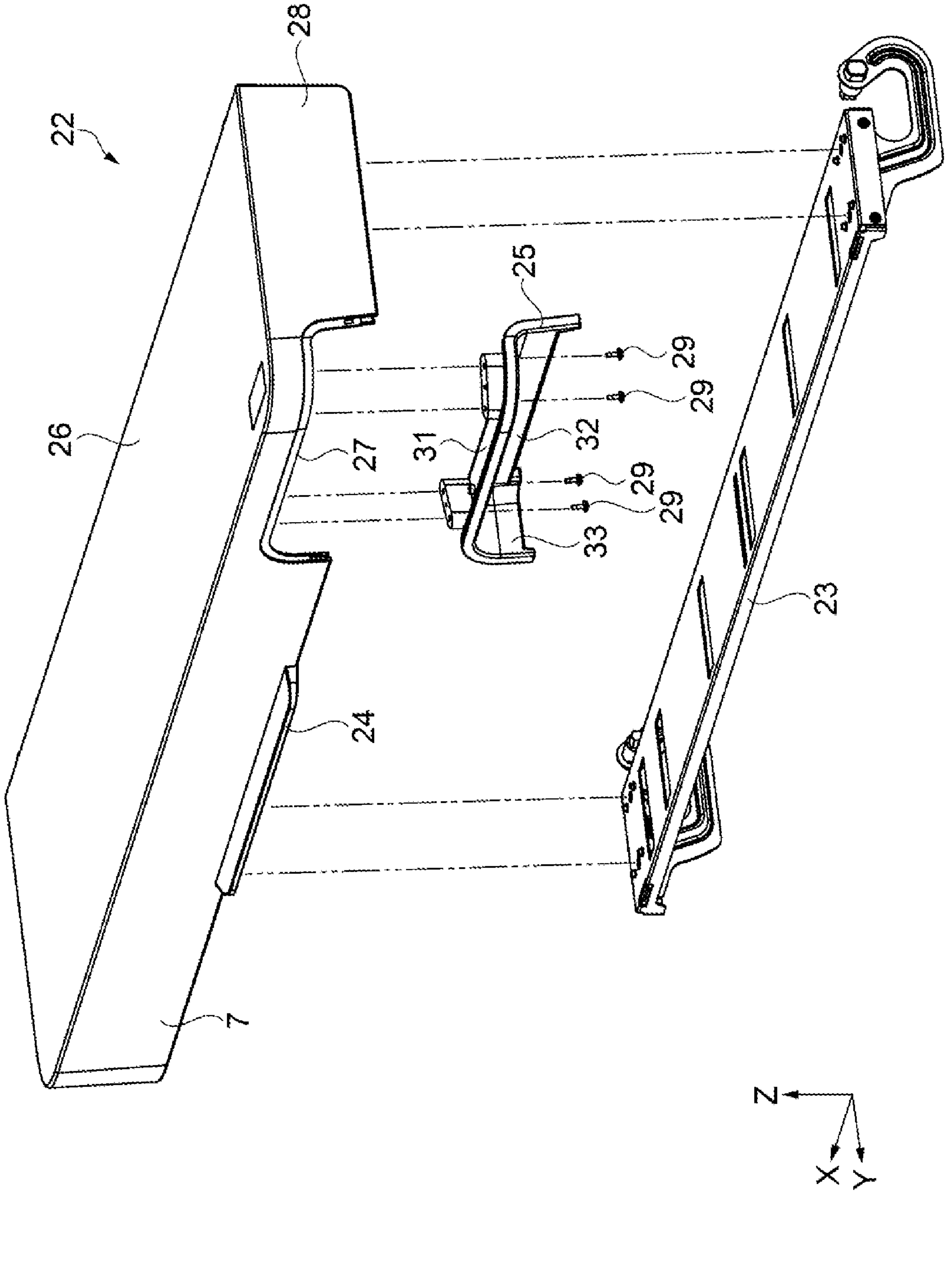
FIG. 4 is an exploded perspective view illustrating an open-close cover.

The open-close cover 22 is configured so as to be able to rotate with a hinge 23, as illustrated in FIG. 3. FIG. 3 illustrates a state in which the open-close cover 22 is opened. As the open-close cover 22 is opened, a user is able to access the printing unit 3 accommodated in the outer packaging 2. The rotational movement shaft of the open-close cover 22 extends along the X-axis. The rotational movement shaft of the open-close cover 22 is disposed at the −Y direction of the front surface 7 of the printing apparatus 1. The open-close cover 22 includes a handle 24. The handle 24 protrudes from the front surface 7 of the open-close cover 22 toward the Y direction, as illustrated in FIG. 4. By lifting upward the handle 24 of the open-close cover 22 in a state in which the open-close cover 22 is closed, a user is able to open the open-close cover 22.

The open-close cover 22 includes the hinge 23, an eaves member 25, a lid member 26, and the handle 24, as illustrated in FIG. 4. The handle 24 is provided at the lid member 26. The lid member 26 is a member of the outer packaging 2 configured to cover the printing unit 3 from the +Z direction, as illustrated in FIG. 2. The hinge 23 illustrated in FIG. 4 is coupled to the lid member 26. The hinge 23 is disposed at the −Z direction of the lid member 26. A cutout portion 27 is formed at the lid member 26. The cutout portion 27 is formed from the front surface 7 of the lid member 26 over the right side surface 28. The right side surface 28 faces the −X direction.

The eaves member 25 is coupled to the lid member 26 with a screw 29. Thus, the eaves member 25 is supported by the lid member 26. The lid member 26 has optical transparency. The optical transparency is a property with which at least a portion of visible light is passed through. The lid member 26 serves as one example of a transparent portion. Since the lid member 26 has the optical transparency, it is possible to easily visually recognize the inside of the outer packaging 2 through the lid member 26 in a state in which the open-close cover 22 is closed. For example, it is possible to visually recognize the printing unit 3 illustrated in FIG. 3 in a state in which the open-close cover 22 is closed. With this configuration, it is possible to easily visually recognize an operation abnormality or the like of the printing unit 3 in a state in which the open-close cover 22 is closed. The eaves member 25 has a light shielding property. The light shielding property is a property of blocking visible light passing through. The eaves member 25 serves as one example of a light shielding portion. The eaves member 25 having the light shielding property is supported by the lid member 26 having optical transparency.

Figure 5:
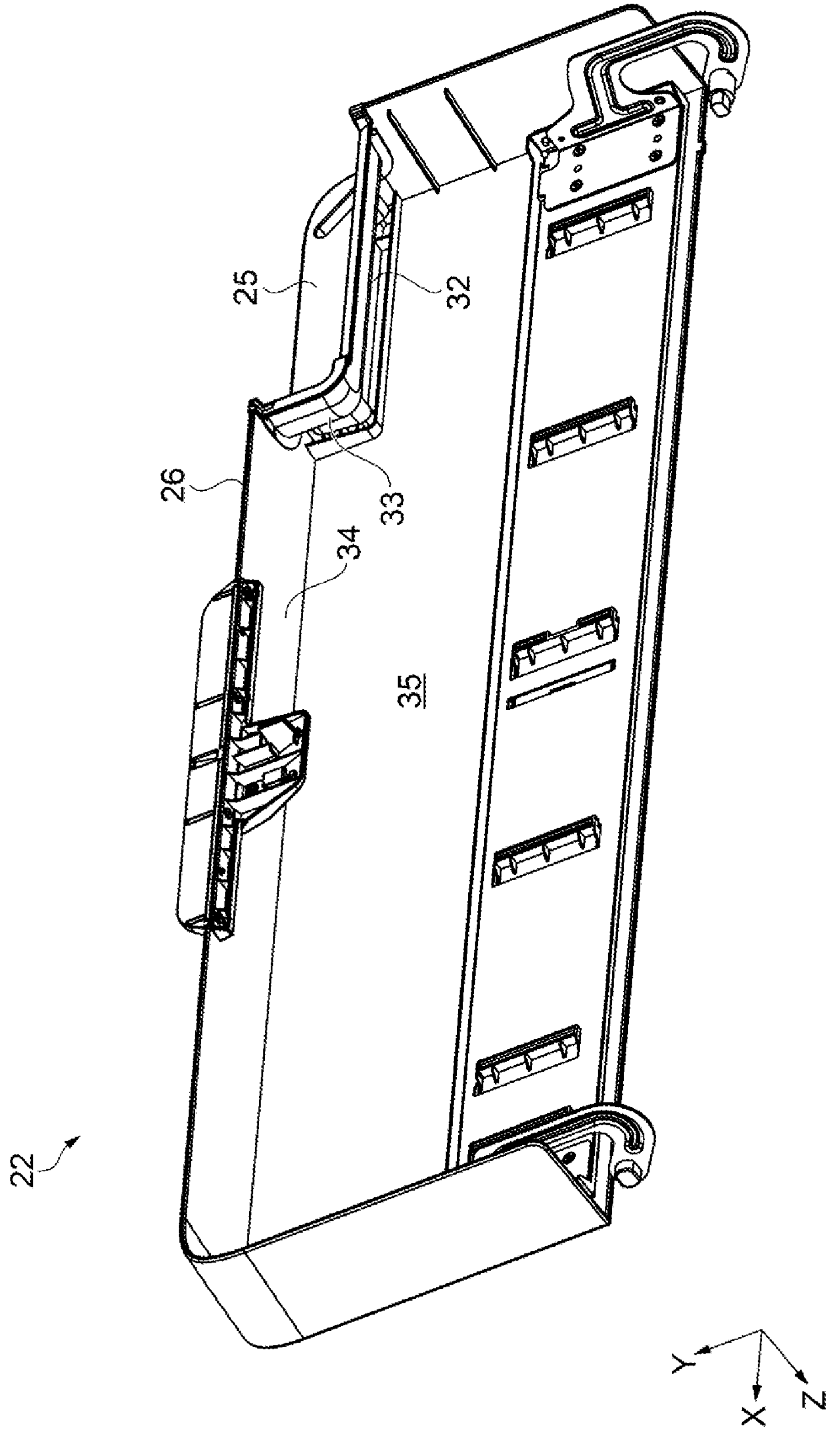
FIG. 5 is a perspective view illustrating the open-close cover.

The eaves member 25 includes an eaves portion 31, a first side wall 32, and a second side wall 33. The eaves portion 31 has a surface intersecting both the X-Z plane and the Y-Z plane. The first side wall 32 intersects the eaves portion 31. The first side wall 32 faces the +Y direction. The first side wall 32 is disposed at the −Y direction of the front surface 7. The first side wall 32 is recessed into the inside of the outer packaging 2 from the front surface 7. The second side wall 33 intersects the eaves portion 31 and the first side wall 32. The second side wall 33 faces the −X direction. The second side wall 33 is disposed at the +X direction of the right side surface 28. The second side wall 33 is recessed into the inside of the outer packaging 2 from the right side surface 28. The eaves member 25 is provided at a portion of the lid member 26 that overlaps with the cutout portion 27. With the configuration described above, a space 35 disposed inside of the open-close cover 22 is sectioned by the side wall 34 of the lid member 26 as well as the first side wall 32 and the second side wall 33 of the eaves member 25, as illustrated in FIG. 5.

Figure 6:
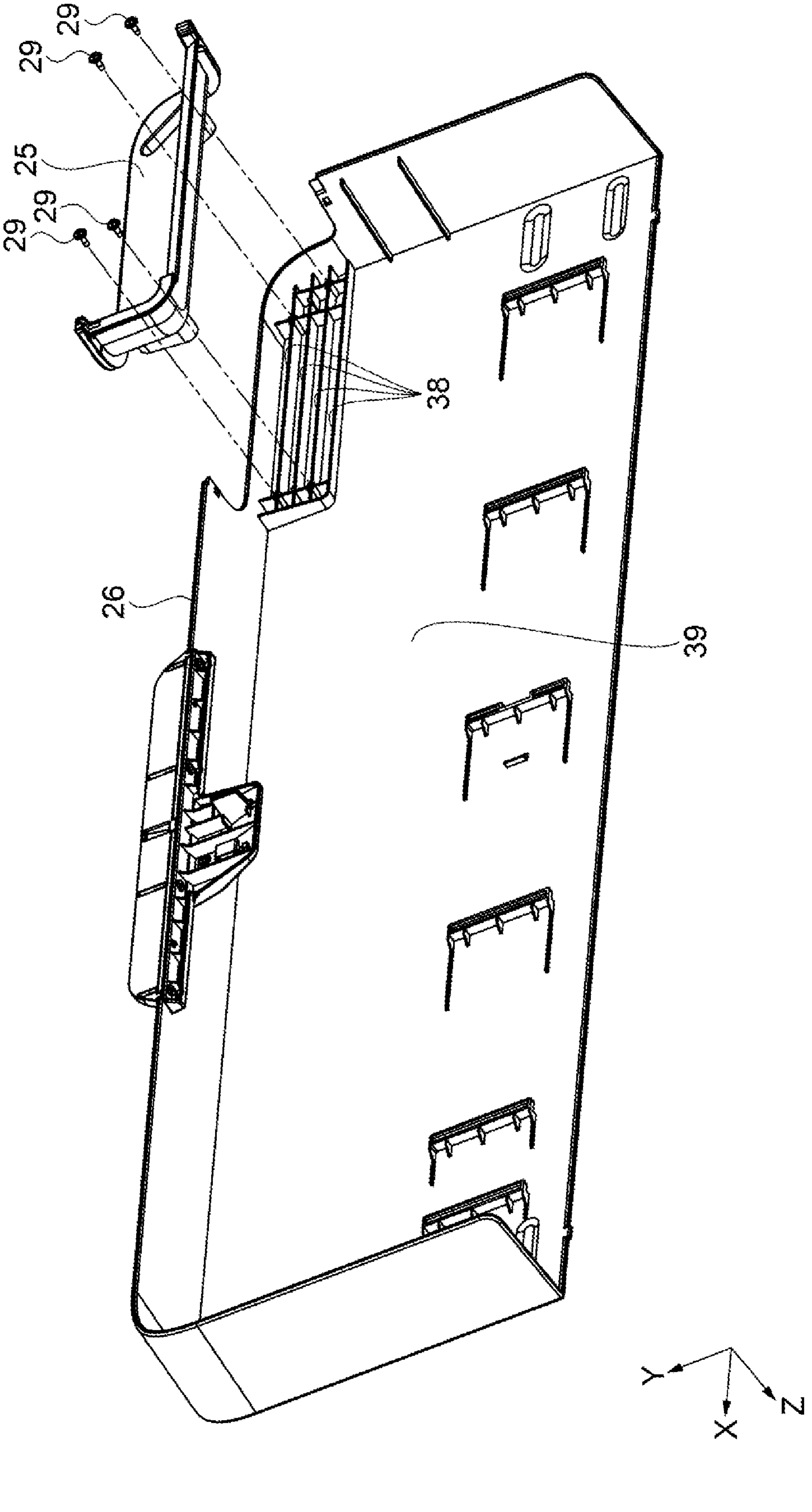
FIG. 6 is an exploded perspective view illustrating a lid member and an eaves member.

The lid member 26 includes a plurality of ribs 38 in a region that overlaps with the eaves member 25, as illustrated in FIG. 6. The plurality of ribs 38 are formed inside of the lid member 26. Of surfaces of the inside of the lid member 26, the plurality of ribs 38 are formed at a surface 39 facing the −Z direction. The plurality of ribs 38 protrude from the surface 39 toward the −Z direction. With the plurality of ribs 38, the lid member 26 provides increased strength. As the region that overlaps with the eaves member 25 has increased strength with the plurality of ribs 38, it is possible to open the open-close cover 22 by holding the eaves member 25 by the hand instead of the handle.

Figure 7:
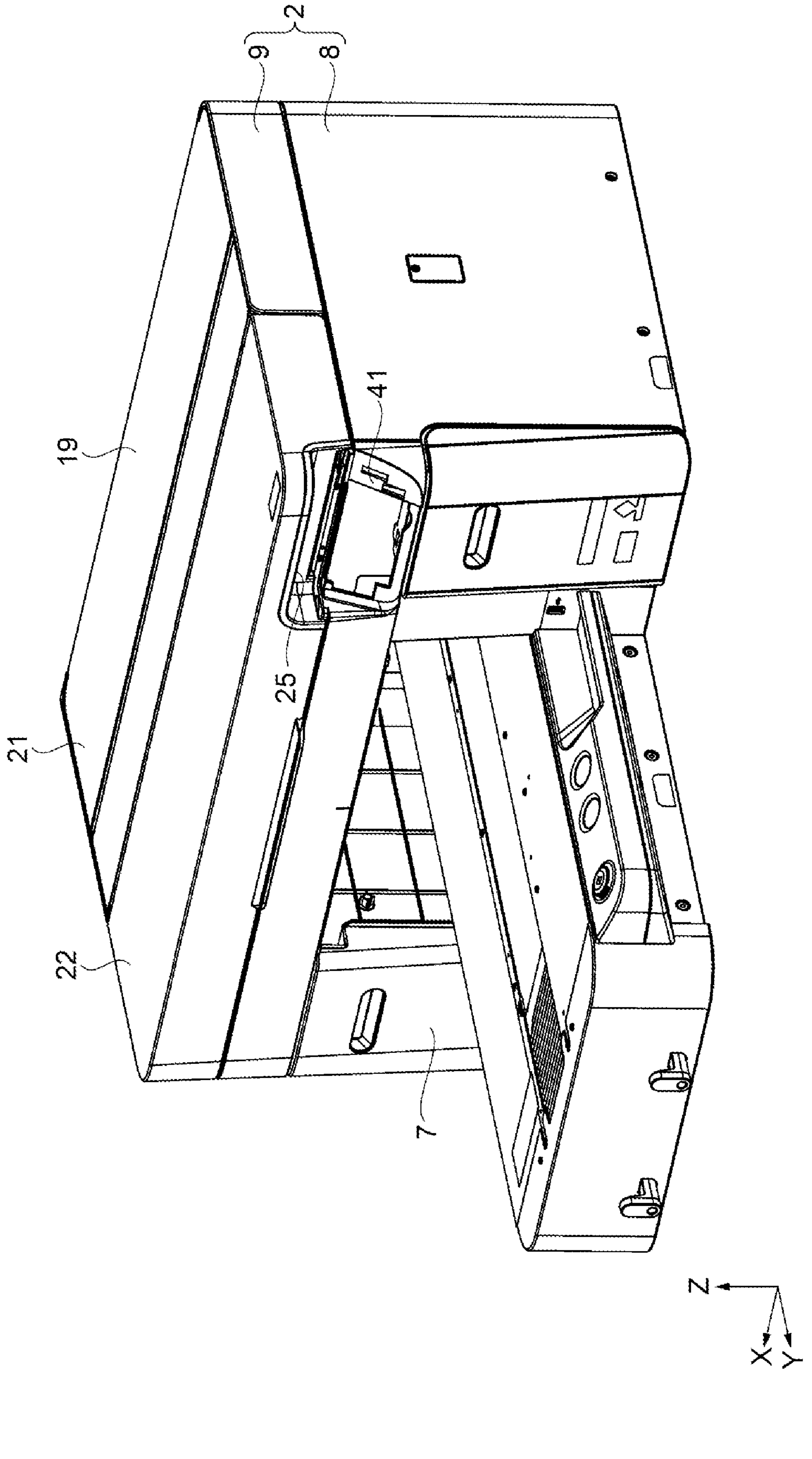
FIG. 7 is a perspective view illustrating an outer packaging.

As illustrated in FIG. 7, the first outer packaging 8 includes a panel equipped portion 41. The panel equipped portion 41 is provided at the front surface 7 of the first outer packaging 8. The panel equipped portion 41 is provided at a region that overlaps with the eaves member 25 in plan view of the upper surface 19 of the outer packaging 2. The panel equipped portion 41 is disposed at the −Z direction of the eaves member 25. The panel equipped portion 41 is disposed at the −Y direction of the front surface 7. The panel equipped portion 41 is recessed into the inside of the outer packaging 2 from the front surface 7. From the +Z direction toward the −Z direction, the panel equipped portion 41 is tilted toward a direction protruding from the −Y direction toward the +Y direction. The panel equipped portion 41 is tilted upward when viewed from the +Y direction toward the −Y direction. The operating panel 5 illustrated in FIG. 3 is disposed at the panel equipped portion 41.

Figure 8:
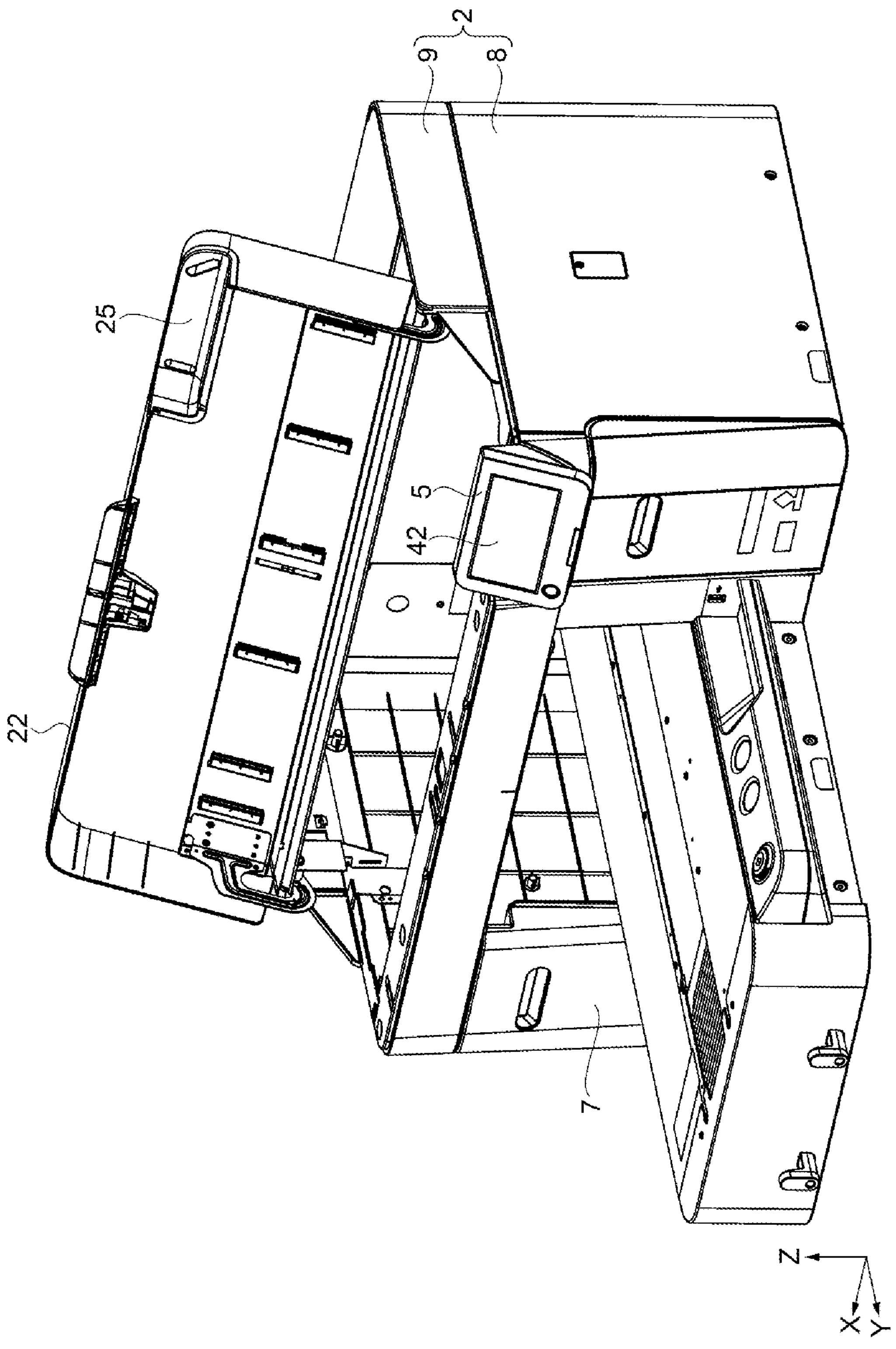
FIG. 8 is a perspective view illustrating the outer packaging and an operating panel.

The operating panel 5 includes a display surface 42 as illustrated in FIG. 8. The display surface 42 displays various types of information. A user visually recognizes the display surface 42, thereby being able to know various types of information. In addition, the operating panel 5 receives an operation from a user. By employing a touch panel for the display surface 42, the user is able to give an instruction concerning an operation of the printing apparatus 1 through the display surface 42. The operating panel 5 receives an operation from the user through the display surface 42. In the present embodiment, the display surface 42 is tilted upward relative to the front surface 7. As the display surface 42 is tilted upward, the user is able to easily visually recognize the display surface 42 from above.

Figure 9:
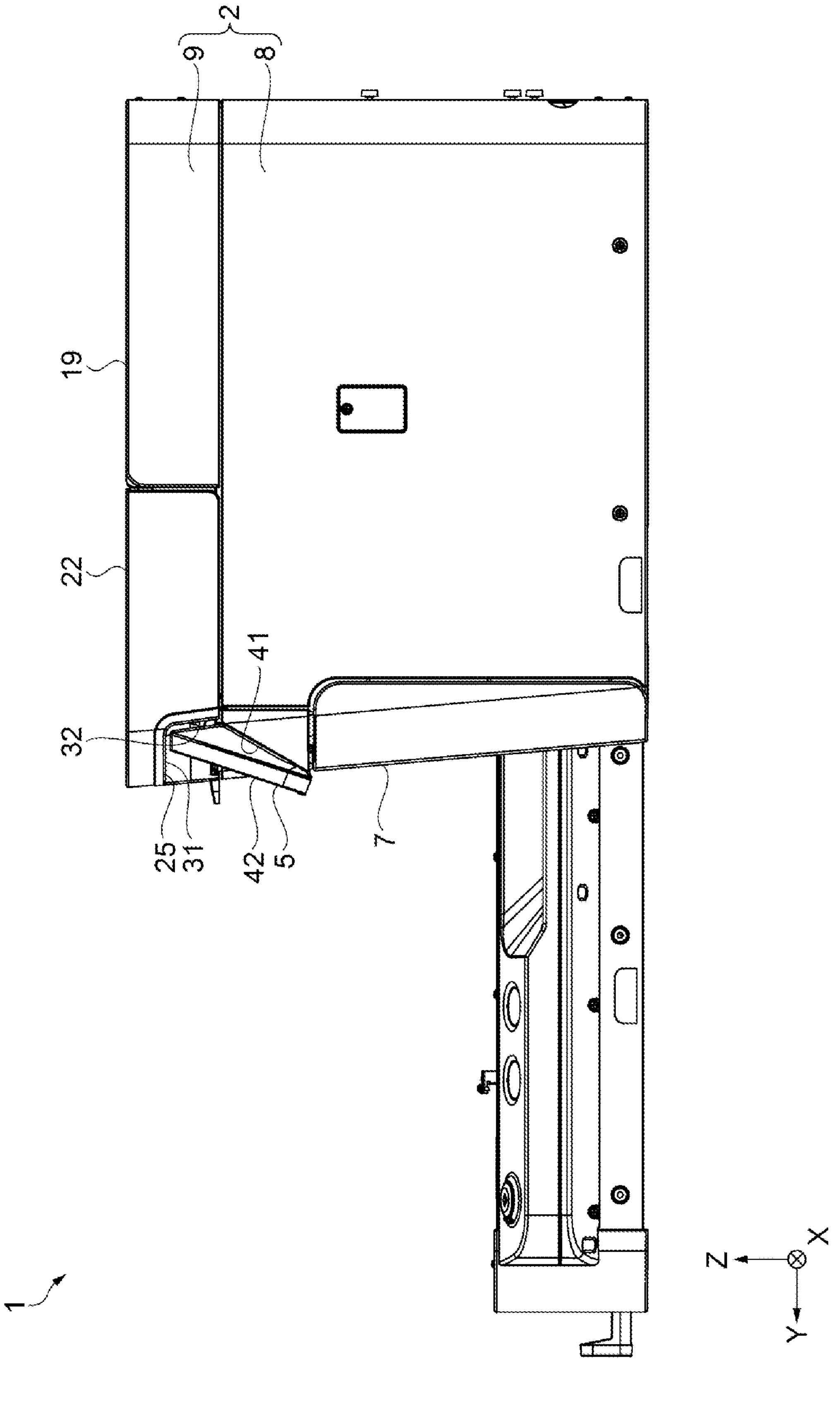
FIG. 9 is a side view illustrating the outer packaging and the operating panel.

In the printing apparatus 1, a portion of the operating panel 5 is recessed into the inside of the outer packaging 2 from the front surface 7, as illustrated in FIG. 9. Being recessed into the inside of the outer packaging 2 does not include a state in which the operating panel 5 is accommodated in the outer packaging 2. In the printing apparatus 1, the operating panel 5 is not entirely recessed into the inside of the outer packaging 2. In the printing apparatus 1, the operating panel 5 is disposed outside of the outer packaging 2. In the printing apparatus 1, the panel equipped portion 41 and the first side wall 32 of the eaves member 25 are recessed into the inside of the outer packaging 2 further than the front surface 7. Thus, at least a portion of the operating panel 5 disposed at the panel equipped portion 41 is recessed into the inside of the outer packaging 2 from the front surface 7, and is fixed. With the printing apparatus 1, at least a portion of the operating panel 5 is recessed into the inside of the outer packaging 2 from the front surface 7, and hence, it is more likely to prevent the operating panel 5 from sticking out from the front surface 7. Thus, it is more likely to prevent the operating panel 5 from blocking the operation to the printing apparatus 1. While the panel equipped portion 41 and the display surface 42 are both tilted upward, the angle of tilt of the panel equipped portion 41 and the angle of tilt of the display surface 42 may be different angles. An end portion, in the −Z direction, of the operating panel 5 recessed into the inside of the outer packaging 2 and fixed overlaps with the open-close cover 22 when viewed from the +Y direction toward the −Y direction. Note that, as illustrated in FIG. 9, the front surface 7 has an angle differing from that of the display surface 42. The front surface 7 is tilted downward. From the −Z direction toward the +Z direction, the front surface 7 protrudes from the −Y direction toward the +Y direction.

The open-close cover 22 included in the outer packaging 2 overlaps with a portion of the operating panel 5 in plan view of the upper surface 19. This makes it more likely to protect the operating panel 5 with the open-close cover 22. Note that it may be possible to employ a configuration in which the open-close cover 22 overlaps with the entire operating panel 5 in plan view of the upper surface 19. That is, it is only necessary to employ a configuration in which the open-close cover 22 overlaps with at least a portion of the operating panel 5 in plan view of the upper surface 19.

In the printing apparatus 1, a portion of the open-close cover 22 that overlaps with the operating panel 5 in plan view of the upper surface 19 is the eaves portion 31. The eaves portion 31 has the light shielding property. Light passing through the lid member 26 having the optical transparency is blocked by the eaves portion 31. Thus, it is possible to enhance the light shielding property of the operating panel 5 for the display surface 42. This makes it possible to reduce the glare of light on the display surface 42 or the like, thereby improving the visibility of the display surface 42. Note that the light passing through the lid member 26 includes lighting or the natural light or the like existing in an environment where the printing apparatus 1 is installed. In addition, when an item that emits light exists in the printing apparatus 1, the light includes light arriving through the lid member 26 due to reflection or refraction.

Description will be made of a printing apparatus 10 to which another example of the open-close cover 22 is applied.

Figure 10:
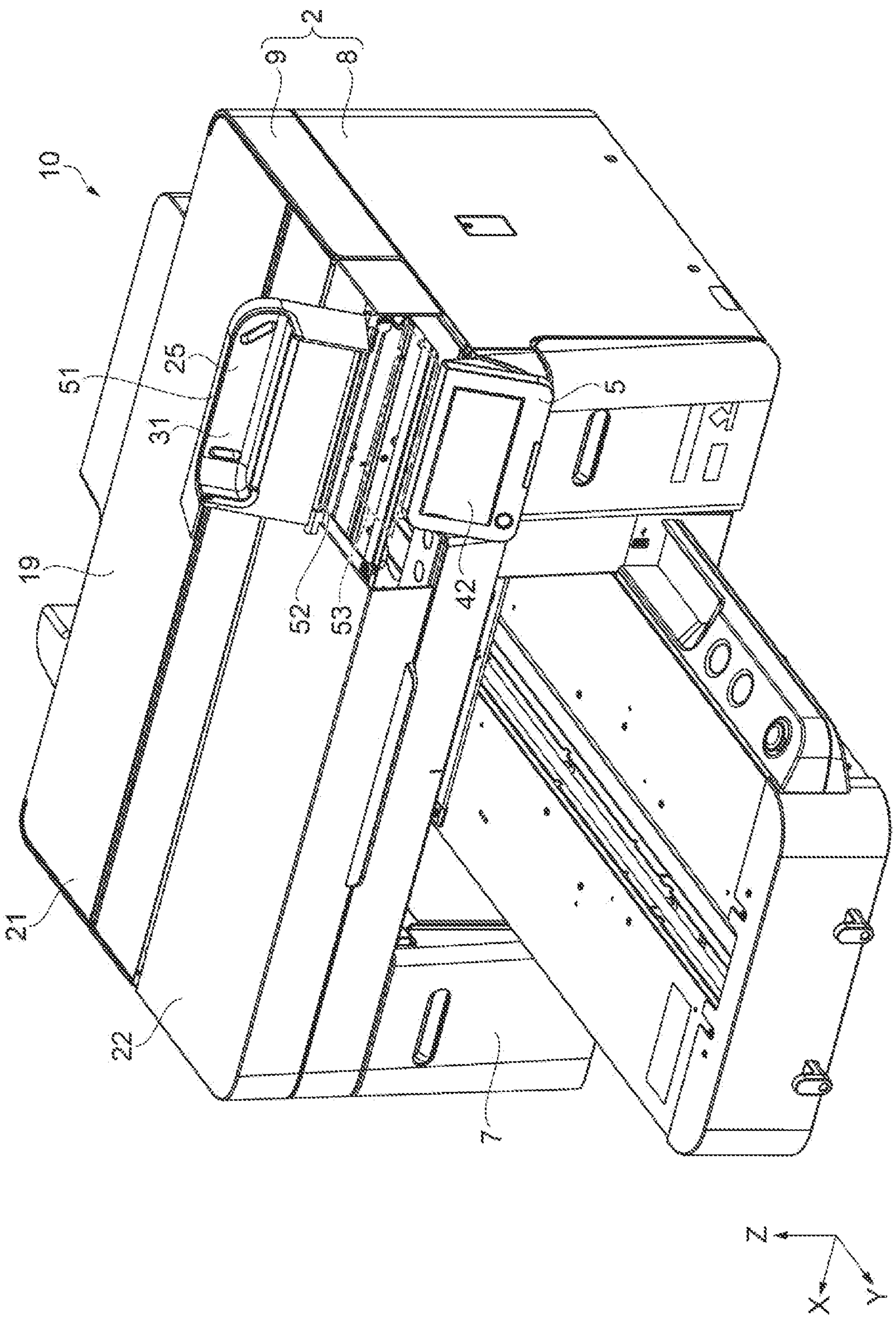
FIG. 10 is a perspective view illustrating another example of the printing apparatus.

In the printing apparatus 10, the open-close cover 22 includes a split cover 51 as illustrated in FIG. 10. The printing apparatus 10 has a configuration similar to that of the printing apparatus 1 except that the open-close cover 22 includes the split cover 51. Thus, of the configurations of the printing apparatus 10, the same configurations as the printing apparatus 1 are denoted by the same reference characters as the configurations of the printing apparatus 1, and detailed explanation thereof will not be provided.

The split cover 51 constitutes the upper surface 19 of the outer packaging 2. The split cover 51 is configured so as to be able to rotate relative to the open-close cover 22. The split cover 51 is configured so as to be able to rotate with a hinge 52. FIG. 10 illustrates a state in which the split cover 51 is opened. The rotational movement shaft of the split cover 51 extends along the X-axis. The rotational movement shaft of the split cover 51 is disposed further toward the +Y direction than the rotational movement of the open-close cover 22. The split cover 51 includes a region that overlaps with the eaves member 25. The split cover 51 also includes a region disposed at the −Y direction from the region that overlaps with the eaves member 25. A maintenance area 53 is provided at the region that overlaps with the split cover 51 in plan view of the upper surface 19. The maintenance area 53 is an area where maintenance is performed to the printing unit 3 illustrated in FIG. 3. The maintenance includes, for example, cleaning of the printing head 11, recovering from clogging of the printing head 11, or the like.

With the printing apparatus 10, it is also possible to obtain an effect similar to that of the printing apparatus 1. In addition, with the printing apparatus 10, when the split cover 51 is opened, a user is able to access the printing unit 3 at the maintenance area 53. By limiting opening the split cover 51 to a region narrower than the region of the open-close cover 22, it is possible to reduce the possibility that foreign materials such as dust enter the inside of the outer packaging 2. Note that, when the open-close cover 22 is opened using the handle 24, it may be possible to employ a configuration in which the whole of the open-close cover 22 including the split cover 51 can be opened.

What is claimed is:

1. A printing apparatus comprising:

a head configured to perform printing on a medium;

an outer packaging configured to accommodate the head; and an operating panel provided at a side surface of the outer packaging and configured to receive an operation, wherein the operating panel includes a display surface, in a state in which the display surface is tilted upward relative to the side surface, at least a portion of the operating panel is recessed into an inside of the outer packaging from the side surface, and is fixed, the outer packaging includes an open-close cover constituting a portion of an upper surface of the outer packaging, and the open-close cover overlaps with at least a portion of the display surface of the operating panel in plan view of the upper surface.

2. The printing apparatus according to claim 1, wherein the open-close cover includes:

a transparent portion made of a material having optical transparency; and a light shielding portion made of a material having a light shielding property, and a portion of the open-close cover that overlaps with the operating panel in plan view of the upper surface is the light shielding portion.

3. The printing apparatus according to claim 2, wherein the open-close cover includes an eaves portion serving as the light shielding portion, the eaves portion being made of a material having a light shielding property.

4. The printing apparatus according to claim 3, wherein the eaves portion is supported by the transparent portion of the open-close cover.

5. The printing apparatus according to claim 1, wherein a portion of the open-close cover that overlaps with the operating panel in plan view of the upper surface is configured to open and close relative to another portion of the open-close cover.

* * * * *